(12) United States Patent
Koeppe et al.

(10) Patent No.: US 8,696,972 B2
(45) Date of Patent: Apr. 15, 2014

(54) METHOD FOR PRODUCING A CUSHION ELEMENT, ESPECIALLY A SEAT CUSHION ELEMENT FOR USE IN A MOTOR VEHICLE, AND CUSHION ELEMENT

(75) Inventors: Matthias Koeppe, Juelich (DE); Martin Werrn, Hagen (DE); Werner Klusmeier, Luebbecke (DE); Andreas Weingaertner, Stemwede (DE)

(73) Assignee: Johnson Controls Technology Company, Holland, MI (US)

( * ) Notice: Subject to any disclaimer, the term of this patent is extended or adjusted under 35 U.S.C. 154(b) by 560 days.

(21) Appl. No.: 12/989,067

(22) PCT Filed: Apr. 17, 2009

(86) PCT No.: PCT/EP2009/002817
§ 371 (c)(1),
(2), (4) Date: Mar. 23, 2011

(87) PCT Pub. No.: WO2009/129964
PCT Pub. Date: Oct. 29, 2009

(65) Prior Publication Data
US 2011/0169320 A1    Jul. 14, 2011

(30) Foreign Application Priority Data

Apr. 22, 2008  (DE) .......................... 10 2008 020 288
Jul. 31, 2008   (DE) .......................... 10 2008 035 622

(51) Int. Cl.
*B29C 67/00*       (2006.01)
(52) U.S. Cl.
USPC ........................................ 264/438; 264/109

(58) Field of Classification Search
None
See application file for complete search history.

(56) References Cited

U.S. PATENT DOCUMENTS

| | | | | |
|---|---|---|---|---|
| 4,386,041 A | * | 5/1983 | Takagi | 264/128 |
| 4,496,623 A | * | 1/1985 | Fraige | 442/44 |
| 5,456,873 A | * | 10/1995 | Nomizo | 264/122 |
| 5,482,665 A | * | 1/1996 | Gill | 264/113 |
| 6,210,147 B1 | * | 4/2001 | Mori et al. | 425/384 |
| 2006/0278322 A1 | * | 12/2006 | Piatkowski et al. | 156/62.2 |

FOREIGN PATENT DOCUMENTS

| | | |
|---|---|---|
| DE | 16 87 695 U | 11/1954 |
| DE | 2241574 | 2/1974 |
| DE | 32 37 025 A1 | 4/1984 |
| DE | 41 36 891 A1 | 5/1993 |
| DE | 197 19 532 A1 | 11/1998 |
| JP | H0313900 | 2/1991 |
| JP | 03-133479 | 6/1991 |

OTHER PUBLICATIONS

Japanese Examination Report dated Apr. 8, 2013.
International Search Report for application No. PCT/EP2009/002817 mailed Feb. 26, 2010.
European Examination Report dated Jul. 12, 2013.

* cited by examiner

*Primary Examiner* — Mary F Theisen
(74) *Attorney, Agent, or Firm* — Fletcher Yoder P.C.

(57) ABSTRACT

A cushion element for a vehicle seat has fibers and foam particles bound by a binder. A precursor material for the cushion element is made by independently adding the fibers and the foam particles together with the binder. The addition and ratio of the fibers and foam particles may depend on their location in the cushion element, and may be influenced by electrostatic discharge means.

5 Claims, 1 Drawing Sheet

METHOD FOR PRODUCING A CUSHION ELEMENT, ESPECIALLY A SEAT CUSHION ELEMENT FOR USE IN A MOTOR VEHICLE, AND CUSHION ELEMENT

CROSS REFERENCE TO RELATED APPLICATIONS

This application claims priority from and the benefit of PCT Application No. PCT/EP2009/002817, filed on Apr. 17, 2009; German Patent No. DE 10 2008 020 288.6, filed on Apr. 22, 2008; and German Patent DE 10 2008 035 622.0, filed on Jul. 31, 2008; all entitled "Method for Producing a Cushion Element, Especially a Seat Cushion Element for Use in a Motor Vehicle, and Cushion Element", which are herein incorporated by reference.

BACKGROUND

The invention relates to a process for producing a cushion element, in particular a seat cushion element for use in a motor vehicle, and also to a cushion element and to a vehicle seat, in particular for a motor vehicle, encompassing a seat portion and a backrest portion, with cushioning which serves to increase seat comfort and which covers the support structure made of metal or plastic.

When cushions for vehicle seats are composed entirely of fiber/latex, the material gives them a high level of set, for an appropriate level of seat comfort. Set improves only when hardness/density rises, but there is a resultant loss of seat comfort. The problem could be solved by using sheet-like inserts made of, for example, PU foam or flake-composite foam, but these inserts impair the breathability of the entire structure. Inserts also increase the production-engineering resources required, because additional semifinished products become necessary. German published patent application DE 3237025 A1 discloses a construction element filled with a fill material, while German patent DE 4136891 B4 discloses a process for producing rubberized hair cushions with foam content. However, this process produces a crude nonwoven in a first step of production, and a second step of production adds a binder, the result being a comparatively expensive and inflexible production process.

Avoidance of the abovementioned disadvantages is an object of the present invention.

SUMMARY

The object of the invention is achieved by means of a process for producing a cushion element, in particular a seat cushion element for use in a motor vehicle, where fibers and foam particles are bound by a binder, where, to produce a precursor material for the cushion element, the fibers and the foam particles are added independently of one another together with the binder to the precursor material. The invention thus advantageously permits firstly production of a high-quality cushion element which in particular exhibits little set, and secondly provides high flexibility during the production process, so that the cushion element of the invention can not only be produced at low cost but can also be adapted flexibly to the planned use.

It is particularly preferable in the invention that the fibers and the foam particles, and also the ratio of these, depend on the location within a mold for producing the cushion element, and in particular that the fibers and the foam particles, and also the ratio of these, depend on the location within the mold along a direction in essence perpendicular to the surface of the subsequent cushion element, and/or depend on the location within the mold along a direction in essence parallel to the surface of the subsequent cushion element. It is thus advantageously possible in the invention to design the cushion element so as to be harder or softer in certain zones or in certain layers within its depth, thus making it possible to produce, in a single production step or molding step, a cushion element ideally adapted to the intended use.

It is also preferable in the invention that the location of the fibers and/or of the foam particles is influenced by means of electrostatic charging during the addition process to form the precursor material. This allows the movement of the foam particles and/or of the fibers to be influenced in controlled fashion during the scatter process or during the construction of the precursor material for formation of the cushion element, so that, by way of example, escape of foam particles and/or fibers (from locations where the foam particles should be present) can be avoided, or so that certain regions of the volume remain free of foam particles and/or fibers.

In the invention, it is moreover preferable that the binder is a latex material and that, after the molding of the cushion element in the mold, a vulcanization step takes place and, respectively, that the foam particles added to the precursor material with the binder comprise foam particles in the form of flakes and/or in the form of beads. This is a particularly simple and inexpensive method of permitting particularly breathable and comfortable design of the cushion element.

The present invention further provides a cushion element, in particular produced by a process of the invention, where the cushion element comprises foam particles and fibers bound by a binder and/or where the fibers and the foam particles, and also the ratio of these, have been arranged within the cushion element so as to depend on the location along a direction in essence perpendicular to the surface of the cushion element, and/or so as to depend on the location along a direction in essence parallel to the surface of the cushion element. It is thus advantageously possible in the invention to design the cushion element so as to be harder or softer in certain zones or in certain layers within its depth, thus making it possible to produce, in a single production step or molding step, a cushion element ideally adapted to the intended use.

With regard to the shape of the foam particles, it is preferable in the invention that these are in essence round, where in particular the foam particles have been provided at least to some extent in the form of flexible hollow spheres, and/or that the shape of the foam particles is in essence a shape that results from tearing or shredding. It is also possible in the invention that mixed shapes and/or different and/or differently shaped foam particles have been arranged at different locations of the cushion element.

The present invention further provides a vehicle seat, in particular for a motor vehicle, encompassing a seat portion and a backrest portion, where the seat portion and/or the backrest portion comprises a cushion element of the invention.

DRAWINGS

Embodiments of the invention are shown in the drawing and are explained in more detail in the description below.

DETAILED DESCRIPTION

Figure 1:
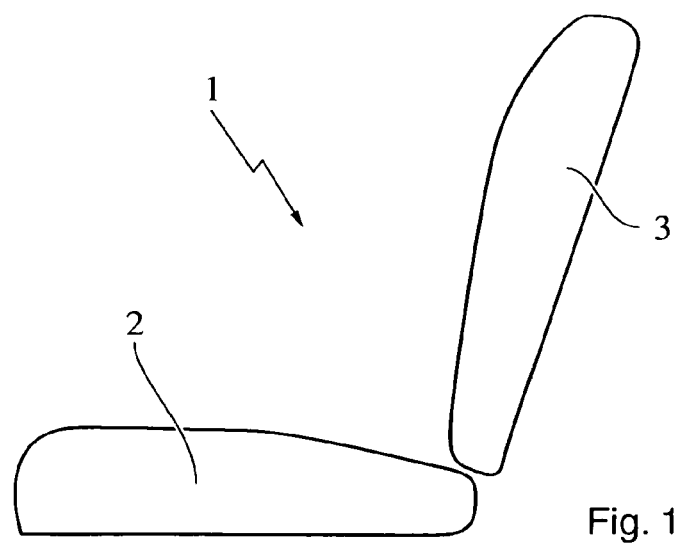
FIG. 1 is a diagram of the side view of a vehicle seat with a seat portion and with a backrest portion.
Figure 2:
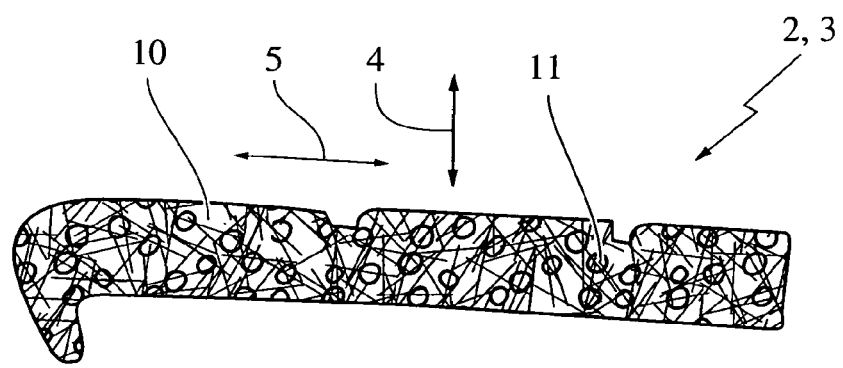
FIG. 2 is a diagrammatic section of a cushion element of the invention for a vehicle seat, in particular either for the seat portion or for the backrest portion.

FIG. 1 is a diagram of the side view of a vehicle seat 1 of this generic type, and FIG. 2 is a diagram of an example of a section through a cushion of the invention or, respectively, a cushion element 2 for a seat portion or, respectively, a cushion or, respectively, a cushion element 3 for a backrest portion of the vehicle seat.

For production of a cushion element 2, 3, fibers 10 are provided with a binder and are scattered directly via a scatter head into preform receptacles or into molds, and there is therefore no need to use, for example, webs or prefabricated nonwovens, for example made of fiber materials.

Figure 3:
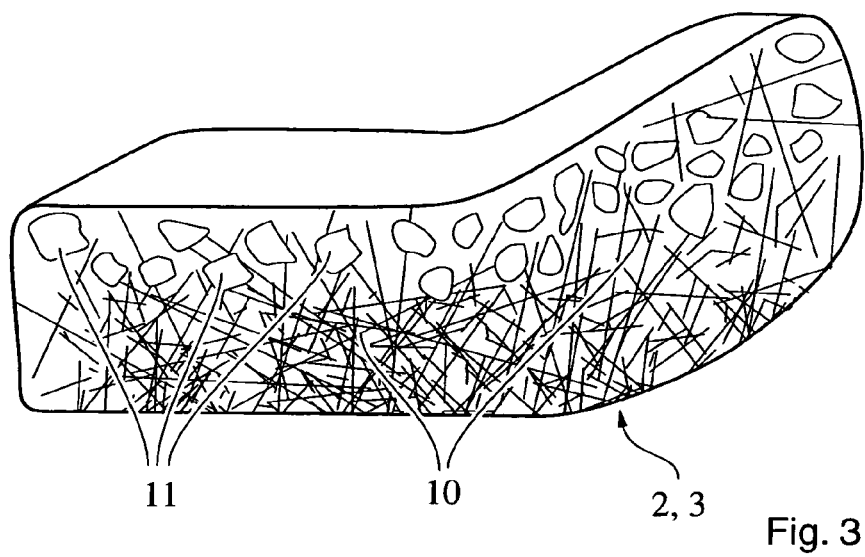
FIG. 3 is another diagram of a cushion element of the invention for a vehicle seat.

The invention provides that, or the invention achieves the object stated in the introduction in that, during the scattering process for a cushion, elastic foam particles 11 in the form of flakes or beads, for example foam flakes or hollow foam spheres, or other suitable particles, are concomitantly scattered into the fiber composite. The location of these is subsequently between the fibers 10, the intention here being to avoid or mitigate collapse of the fibers 10 with resultant set. The ratio of foam particles 11 and fibers 10 can be controlled during the scatter process. FIG. 3 is a diagram of an embodiment of a cushion element, in which the ratio of foam particles 11 and fibers 10 is controlled during the scatter process in such a way as to provide partially increased introduction of the (foam) particles into zones subject to high load, e.g., within the raised region of the seat. This method advantageously permits controlled alteration of the composition of the precursor material formed for the production of the cushion element 2, 3, not only in a direction 4 which is in essence perpendicular to the surface of the finished cushion element 2, 3 but also in a direction 5 which is in essence parallel to the surface of the finished cushion element 2, 3. By way of example, this alters the thickness of the precursor material, the composition of the precursor material and/or the ratio of foam particles 11 and fibers 10 within the precursor material.

In one preferred embodiment, for reasons of sustainability, a latex foam is used, but it is also possible to use any of the other types of flexible materials.

The shape of the foam particles 11 can vary. In one preferred embodiment they are torn or shredded particles, and in another particularly preferred embodiment the shape is that of a flexible hollow sphere made of, for example, latex, which has the concomitant rheological advantage of avoiding orientation.

The advantage of the individual foam particles 11 in comparison with the sheet-like foam insert is that only local binding to the fibers 10 occurs by way of the liquid latex, and the breathability of the components is thus retained. Hardness, and therefore seat comfort, can be adjusted by way of the mix of material, i.e. in particular by varying the binder—in particular the type of latex—and/or varying the fibers and/or the foam particles.

During the scattering process or lay-up process, the additional foam particles 11 are automatically introduced into the fiber-latex mixture, and a very wide variety of conveying techniques are suitable for this purpose. In order to inhibit escape of the foam particles 11, they can be held in place by means of static charging. This method also allows certain regions to be kept completely or at least substantially free of foam particles (e.g. by using electrostatic repulsion).

The wet latex mixture introduced with the fibers 10 and with the foam particles 11, or some other matrix material, binds the fibers 10 to the foam particles 11 durably, locally, and flexibly. The vulcanization process forms a heterogeneous, porous, and highly flexible component with high seat comfort. Air-permeability is excellent, and this permits passive air-conditioning of seats.

KEY

1 Vehicle seat
2 Seat portion/cushion element of seat portion
3 Backrest portion/cushion element of backrest portion
4 Direction in essence perpendicular to the surface of the cushion element
5 Direction in essence parallel to the surface of the cushion element
10 Fiber
11 Foam particles

The invention claimed is:

1. A process for producing a cushion element for a motor vehicle seat, comprising fibers and foam particles bound by a binder, wherein to produce a precursor material for the cushion element, the fibers and the foam particles are added independently of one another together with the binder to form the precursor material;
   wherein a location of the fibers and/or of the foam particles during the addition process to form the precursor material is influenced by means of electrostatic charging.

2. The process as claimed in claim 1, wherein the addition of the fibers and the foam particles, and also the ratio of these, depend on a location within a mold for producing the cushion element.

3. The process as claimed in claim 1, wherein, within a mold, the addition of the fibers and the foam particles, and also the ratio of these, depend on a location along a direction substantially perpendicular to a surface of a subsequent cushion element and/or on a location along a direction substantially parallel to the surface of the subsequent cushion element.

4. The process as claimed in claim 1, wherein the binder is a latex material; and
   the process for producing the cushion element comprises vulcanizing the precursor material after molding of the precursor material in a mold to form the cushion element.

5. The process as claimed in claim 1, wherein the foam particles added with the binder comprise foam particles in the form of flakes and/or in the form of beads.

* * * * *